Feb. 13, 1951 — L. F. BINGHAM — 2,541,911
INDUSTRIAL CHAIN
Filed Aug. 21, 1948 — 3 Sheets-Sheet 1
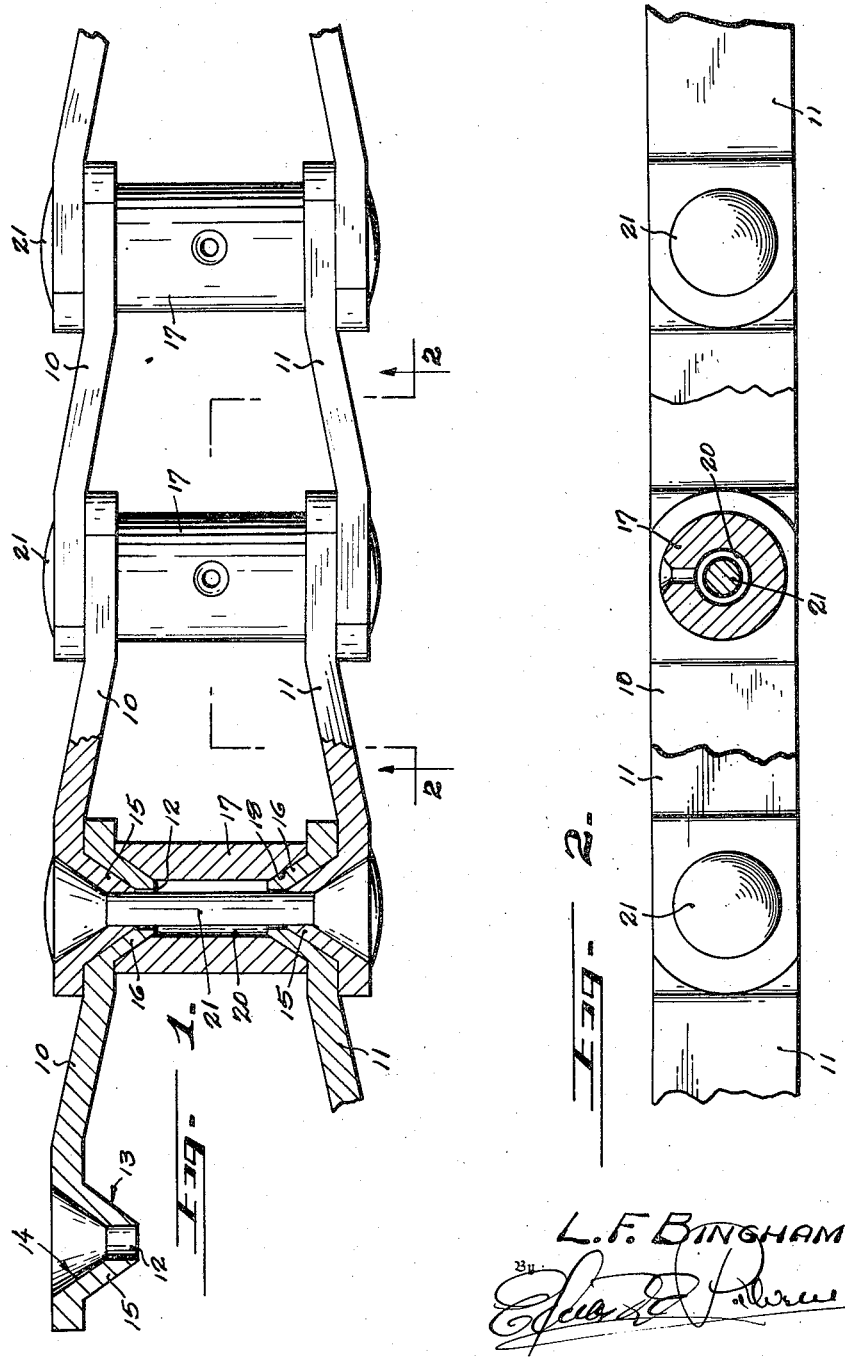
Inventor
L. F. BINGHAM
By
Attorney Feb. 13, 1951 L. F. BINGHAM 2,541,911
INDUSTRIAL CHAIN
Filed Aug. 21, 1948 3 Sheets-Sheet 2
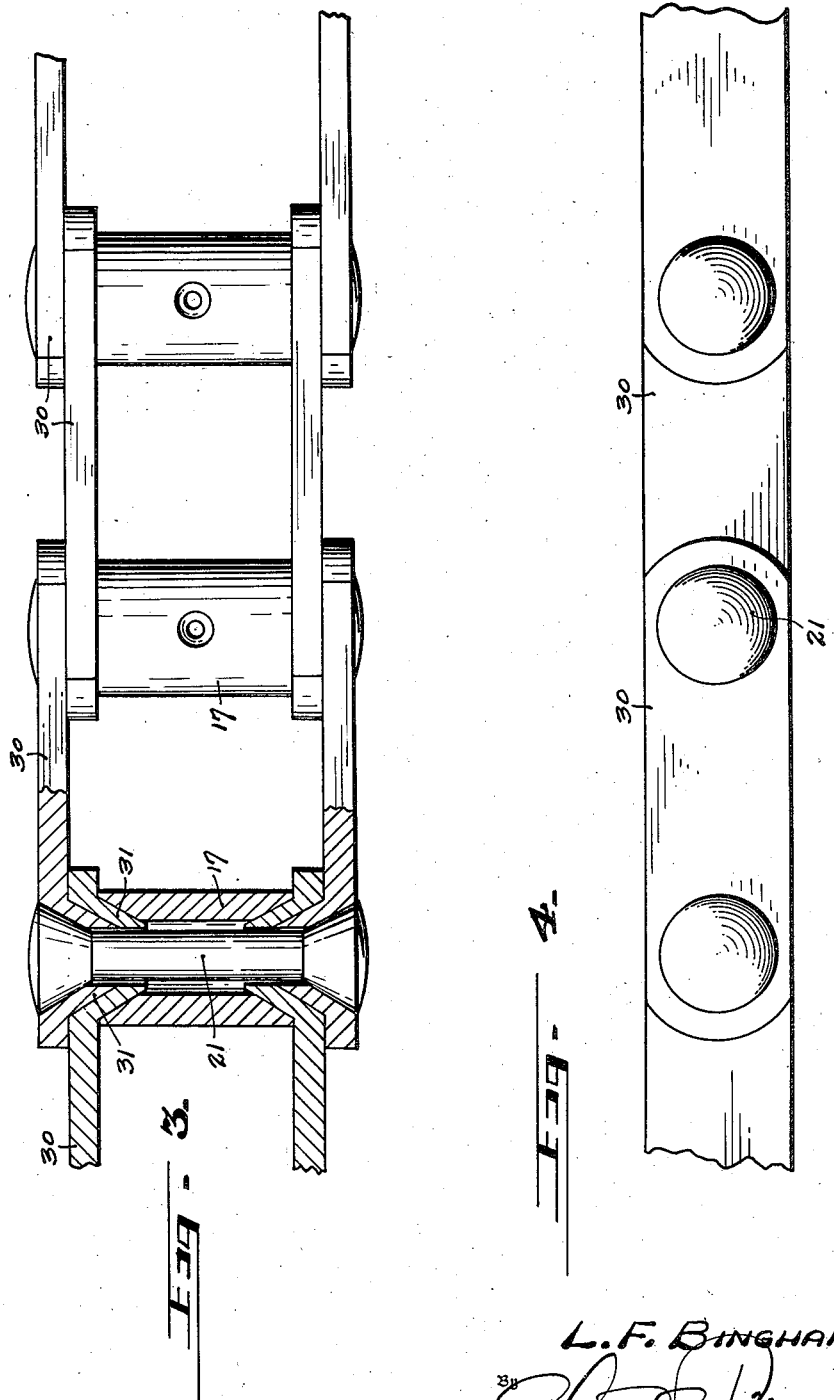
Inventor
L. F. BINGHAM
By
Attorney Feb. 13, 1951 L. F. BINGHAM 2,541,911
INDUSTRIAL CHAIN
Filed Aug. 21, 1948 3 Sheets-Sheet 3
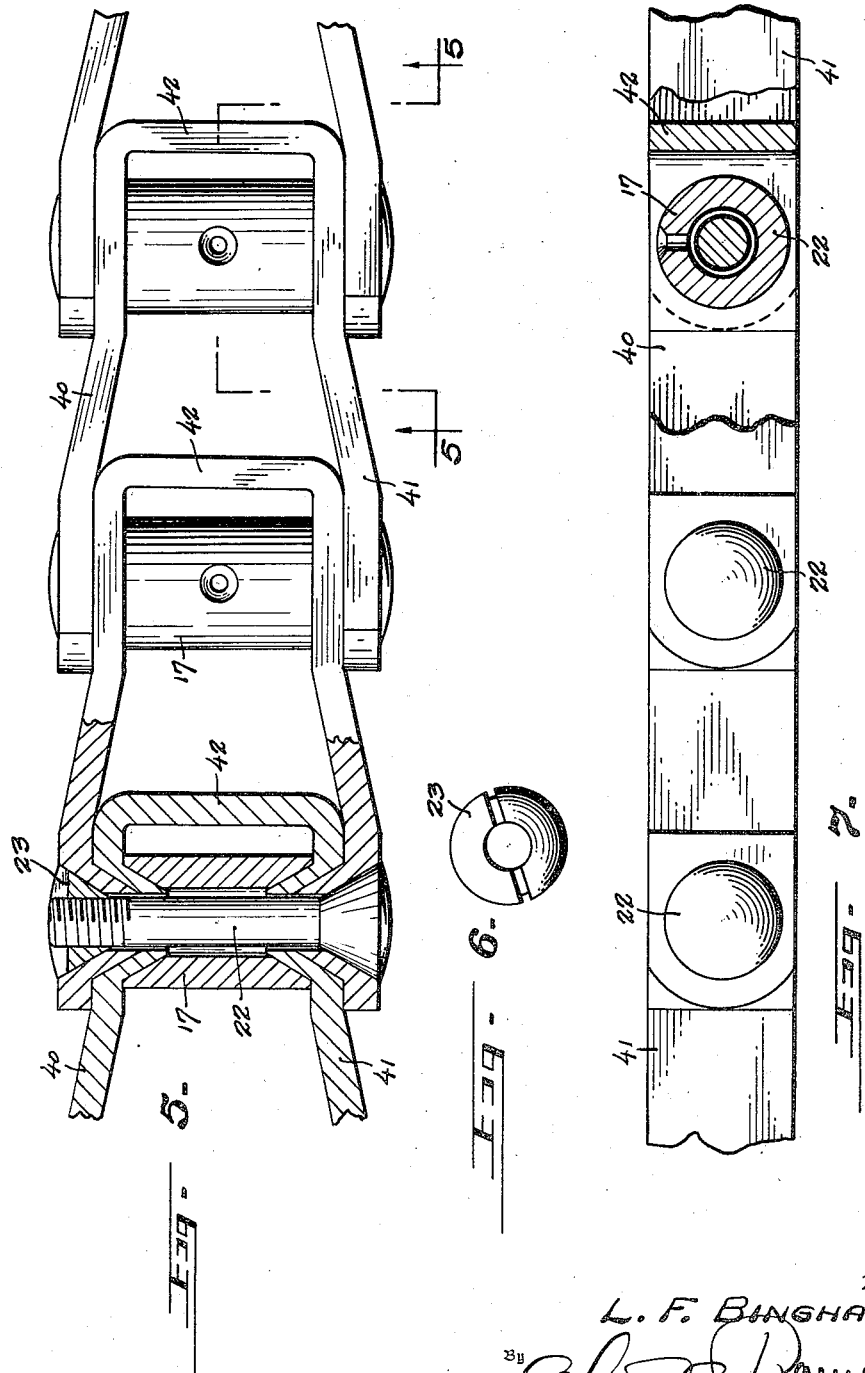
Inventor
L. F. BINGHAM
By [signature]
Attorney Patented Feb. 13, 1951

2,541,911

UNITED STATES PATENT OFFICE 2,541,911

INDUSTRIAL CHAIN

Lawrence F. Bingham, Bellingham, Wash.

Application August 21, 1948, Serial No. 45,489

9 Claims. (Cl. 74—251)

This invention relates to the art of chain construction, and particularly industrial chain arranged and adapted to operate with sprocket wheels as drives, elevators, or conveyors. There are, in general, only two kinds of industrial chain, namely cast and steel fabricated chain, and the distinction lies in the fact that the side bars of the fabricated type of chain are produced from flat plate and are made independent of the barrel separators whereas, in cast chain, the barrel members are integrated with the side bars either in a unit U-shaped piece or in two abutting or telescoping L-shaped pieces. Common to all such chains, both cast and steel fabricated, is a swivel pin passing through the barrel separator and its related side bars and giving connection with the lapping ends of the side bars of a next adjacent link in the chain, and while the swivel bearing for the pin is, in some types of cast chain, complemented by an interlocking fit as between the lapped ends of the side bars, substantially all fabricated-type chain heretofore available has relied simply upon the pin or a bushing therefor to withstand the endwise strain passed along the length of the chain. The result is that the pin or the bushing, as the case may be, is made subject to shearing wear, and practical design precludes a dimensioning of either the pin or the bushing to such a thickness, in the smaller sizes of chain, as will preclude shearing breakage under heavy strain. Substantially the same fault is, moreover, present with the interlocking arrangements of cast chain as the same have been heretofore engineered, substantially all of the interlocking processes of which I am aware being comprised simply of boss prolongations, cylindrical in shape, made integral with one side bar and fitting in corresponding sockets provided by the side bar lapped thereby. It is the cylindrical shape of these boss processes which I consider to be objectionable, in that the chain's resistance to shearing breakage is determined solely by the wall thickness of the boss and the diameter of the latter at its point of juncture with the parent side bar, and which inherently demands, if a boss of large diameter is to be employed, that the side bar into which this boss is socketed be itself produced to a width considerably larger than the boss and the resulting chain consequently becomes quite bulky. To all practical intents and purposes, the interlocking processes as they have been heretofore engineered for cast chain become the functional counterparts of the bushings provided for steel-fabricated chain.

The present invention has for its general object the provision of an industrial-type chain, and namely one adapted for drive, elevator, or conveyor usage, admitting of being produced either as a casting or by cold-drawing bar steel, and which is essentially characterized in that a mating interlock is provided as between adjacent links peculiarized in its provision of interfitting male and female members which are of conical shape and which function as the sole bearing for the swivel movement of the links. Other and more particular objects and advantages will, with the foregoing, appear and be understood in the course of the following description and claims, the invention consisting in the novel construction and in the adaptation and combination of parts hereinafter described and claimed.

In the accompanying drawings:

Figure 1 is a fragmentary view, partly in top plan and partly in horizontal section, illustrating an industrial chain having its component links produced in accordance with one embodiment of the present invention.

Fig. 2 is a view thereof principally in side elevation but partially in longitudinal vertical section and with the section taken on the line 2—2 of Fig. 1.

Fig. 3 is a fragmentary view of a somewhat modified form of chain in which the only distinction from the chain portrayed in Figs. 1 and 2 is that the side bars are made straight rather than offset.

Fig. 4 is a side elevational view of the chain shown in Fig. 3.

Fig. 5 is a fragmentary view showing yet another modification of the invention characterized in that the two side bars of each link are integrated at one end by a cross-tie, and which is distinguished further in that a nutted bolt, rather than a rivet, is applied as a binding instrumentality to hold the side bars against lateral displacement.

Fig. 6 is a detail end elevational view of the nut for said bolt; and

Fig. 7 is a side elevational view of the chain portrayed in Fig. 5 and also, as in Fig. 2, shown partly in longitudinal vertical section with the section line shown at 7—7 of Fig. 5.

With reference being had to said drawings, and first describing the embodiment of Figs. 1 and 2, the side bars, designated by the numerals 10 and 11, have their two ends offset parallel to one another in substantial correspondence with the thickness or gauge of the metal, and there is drawn inwardly from each of these parallel ends a stud-like projection produced in the shape of a truncated cone. This stud is center-bored, as at 12, and has both its exposed and recessed faces developed in substantial correspondence, and this is to say that the male surface 13 of the cone-shaped nose which protrudes inwardly from the inside face of the bar finds its matching counterpart in the female surface 14 let in from the outside face of the bar. Designated by 15 and 16, the two studs of each side bar are identical and as will be apparent from an inspection of the drawings are intended in use to find a mating interfit, the male surface of the stud 15 of one side bar within the female surface of the stud 16 of a next adjacent side bar.

Applied, as is customary, at the narrow end of each chain link is a barrel member 17 performing the usual office of a spacer holding the side bars in separated relation, and formed in each end of this barrel is a cone-shaped cavity 18 produced as the matching counterpart of the male surface 13, thus to establish a mating interfit with the stud 16. The barrel members have a center-bore 20 which is, by preference, somewhat larger than the center-bore 12 of the stud 16, and the center-bore of the latter is in turn slightly larger than the center-bore 12 of the stud 15, and received through this bore 20 and the registering bores 12 of the two mating studs is a binding pin. This pin is indicated in Figs. 1 and 2, and also in Figs. 3 and 4, as comprising a rivet 21 having its ends upset to snugly fit the cavities exposed to the outside of the related link juncture, but such might as well be comprised of a cone-headed bolt threaded for the reception of a cone-shaped nut and such, for example, as I designate by 22 and 23, respectively, in Fig. 5. The barrel 17 can be spot-welded in place to become an integral cross-arm of each link or, if desired, can be left free to rotate as a roller.

Relative to the modified chain which I have portrayed in Figs. 3 and 4, the joint construction is the same as previously described and substantially the only departure is that the side bars, here designated by 30, are made straight, permitting the bars to be reversed end-for-end as well as allowing the two truncated-cone studs 31 to be interchangeably applied, and by which I mean to say that the side bars admit of having either the male or female surfaces of their studs interfitted with the lapping end of a next adjacent side bar of the chain, dictated by placing the side bars in question upon the outside or upon the inside of the lapped side bars of a next adjacent link of the chain.

In Figs. 5 and 7 I have illustrated yet another modification which here again employs substantially the same joint construction but which is peculiarized in that the two side bars 40 and 41 of each link, these side bars being of offset design, are tied at the narrow end of the link by a spanner-arm 42 made an integral part of the bars. A somewhat similar type of link could of course be produced with the side bars straight and embodying a cross-tie at both ends, and made either as a casting or by cold-drawing bar steel, the latter utilizing a weld connection to join abutting ends of the bar which produce one of the two cross-ties. Side bars of substantially the design shown in Fig. 3 would be used in conjunction with this last-mentioned modification to connect two such links in separated following relation to one another, producing that which is known in the industry as a "combination" chain.

It is thought that the invention, and its advantages, will have been clearly understood from the foregoing description, the point of particular import being that the diameter of the bearing surfaces on the planes in which shear takes place may be made to very nearly approximate the diameter of the barrel members. There is, moreover, the further factor of material thickness, and in this respect it is to be noted that a horizontal line of cleavage paralleling the base of a hollow cone necessarily comprehends, in its traversal of the wall, a width of material greater than the actual thickness of the wall.

The embodiments of the invention which I have elected to illustrate are deemed to best exemplify the teachings, but it is self-evident that design changes may be resorted to without departing from the spirit of the invention, and it is accordingly my intention that the hereto annexed claims be given a scope in the reading thereof fully commensurate with the broadest interpretation to which the employed language fairly admits.

What I claim is:

1. A chain composed of multiple U-shaped links of which the open end of one link laps the closed end of a next adjacent link and with said lapped ends being joined for swivel movement, the swivel joint comprising inwardly directed cone-shaped studs provided by the side bars of one said link and finding a mating interfit with matching sockets provided by the side bars of the other said link.

2. A chain comprised of multiple links each fabricated from paired side bars of offset design with a barrel applied at the narrow end of the link to separate the side bars, and having said components of the link bound together and joined for swivel movement to the lapping side bars of a next adjacent and correspondingly formed link of the chain by a traversing pin, the barrel separator providing a cone-shaped socket in each of its two ends and said side bars each having an inwardly directed cone-shaped stud formed as the mating complement of said sockets and formed integrally from the material of which the side bars are composed, the swivel joint being produced by a mating interfit the studs of the outer side bars with the conical recesses in the studs of the inner side bars and the studs of the inner side bars with the sockets of the barrel separator.

3. A chain according to claim 2 having the two side bars of each link produced from a single length of material bent to a substantial U-shape and with the cross-arm which connects the side bars being placed at the narrow end of the link and offset beyond the studs to serve as a spreader.

4. A chain comprised of multiple swivel-joined links each fabricated from paired side bars of straight design and used in conjunction with an intervening barrel, the barrel providing a cone-shaped socket in each of its two ends and said side bars being provided at each extremity with a cone-shaped stud produced as the mating complement of said sockets and formed integrally from the material of which the side bar is composed, the swivel joint being established by interfitting the studs of one set of side bars into the sockets of the barrel and interfitting the studs of another and lapping set of side bars into the sockets in the studs of the inner said side bars.

5. The chain of claim 1 in which the studs are formed integrally from the material of which the related side bar is composed, said barrel and the studs being each center-bored, and a pin headed upon each end and received through said registering bores with the heads finding a snug fit in the sockets in the studs of the outermost side bars.

6. A chain comprised of a plurality of pairs of overlapped side bars having their lapping ends provided with inwardly projected cone-shaped studs with the outermost studs finding a mating fit in cone-shaped sockets in the innermost studs, and barrel separators extending transversely between opposed innermost studs and having cone-shaped sockets at their ends into which the innermost studs find a mating fit.

7. A chain as in claim 6 wherein the separators and studs are center-bored and traversing pins extend through the bored studs and separators.

8. A chain as in claim 7 wherein the outermost studs have sockets therein and the pins are headed upon each end, the heads finding a snug fit in the said outermost stud sockets.

9. A chain comprised of a plurality of pairs of overlapped side bars having their lapping ends provided with inwardly directed studs with the outermost studs finding a snug mating fit in sockets in the innermost studs, and separators extending transversely between opposed innermost studs and having sockets at their ends into which the innermost studs find a snug mating fit.

LAWRENCE F. BINGHAM.

REFERENCES CITED

The following references are of record in the file of this patent:

UNITED STATES PATENTS

| Number | Name | Date |
|---|---|---|
| 657,945 | Levalley | Sept. 18, 1900 |
| 703,499 | Sturmey | July 1, 1902 |
| 1,259,716 | Bens | Mar. 19, 1918 |
| 2,280,502 | Stenger | Apr. 21, 1942 |